(12) United States Patent
Yuan

(10) Patent No.: US 11,078,836 B1
(45) Date of Patent: Aug. 3, 2021

(54) SYSTEM AND METHOD OF RECIPROCATING PISTON ENGINE, MULTI-FUEL PISTON ENGINE

(71) Applicant: CANADAVFD CORP (LTD), Ottawa (CA)

(72) Inventor: Defang Yuan, Ottawa (CA)

(*) Notice: Subject to any disclaimer, the term of this patent is extended or adjusted under 35 U.S.C. 154(b) by 0 days.

(21) Appl. No.: 16/885,834

(22) Filed: May 28, 2020

(51) Int. Cl.
| | | |
|---|---|---|
| *F02B 75/28* | (2006.01) | |
| *F02B 75/16* | (2006.01) | |
| *F01M 13/04* | (2006.01) | |
| *F02B 33/30* | (2006.01) | |
| *B60K 15/03* | (2006.01) | |
| *B60K 13/00* | (2006.01) | |
| *F02D 13/02* | (2006.01) | |
| *F02B 33/04* | (2006.01) | |
| *F02B 21/00* | (2006.01) | |

(52) U.S. Cl.
CPC ............ *F02B 75/28* (2013.01); *B60K 13/00* (2013.01); *B60K 15/03006* (2013.01); *F01M 13/04* (2013.01); *F02B 21/00* (2013.01); *F02B 33/04* (2013.01); *F02B 33/30* (2013.01); *F02B 75/16* (2013.01); *F02D 13/0223* (2013.01); *B60K 2015/0321* (2013.01); *B60K 2015/03243* (2013.01); *F02D 2200/0611* (2013.01)

(58) Field of Classification Search
CPC .......... F02B 75/28; F02B 21/00; F02B 33/04; F02B 33/30; F02B 75/06; F02B 19/00; B60K 13/00; B60K 15/03006; B60K 2015/0321; F01M 13/04; F02D 13/0223
See application file for complete search history.

(56) References Cited

U.S. PATENT DOCUMENTS

| | | | |
|---|---|---|---|
| 7,387,093 B2 * | 6/2008 | Hacsi .................... | F02B 75/042 123/51 R |
| 2010/0307440 A1 * | 12/2010 | Ma ......................... | F02B 21/00 123/179.3 |
| 2013/0327291 A1 * | 12/2013 | Pett, Jr. .................. | F02B 19/00 123/253 |

* cited by examiner

*Primary Examiner* — Syed O Hasan

(57) ABSTRACT

The present disclosure relates to piston engine systems which are no longer restricted by their compression ratios. Rather, a mixture of fuel and pre-compressed air is used to complete the combustion. The pressure of the compressed air is independently controlled. As a result, the clearance volume can be reduced to less than 1/50 or to zero, and the piston engine systems can be used with different types of fuels, for example, gasoline, diesel, ethanol, or vegetable oils.

20 Claims, 5 Drawing Sheets

SYSTEM AND METHOD OF RECIPROCATING PISTON ENGINE, MULTI-FUEL PISTON ENGINE

FIELD OF THE INVENTION

The present disclosure relates to piston engine. More specifically, the present disclosure relates to reciprocating piston engine and multi-fuel piston engine systems which are not restricted by their compression ratio.

BACKGROUND OF THE INVENTION

Each type of fuel has its own characteristics; and as such, requires different combustion conditions.

Generally speaking, in a piston combustion engine, compression ratio is the ratio of the maximum to minimum volume in the cylinder, in other words, it is the ratio of the volume of the combustion chamber when the piston is at the bottom dead center (BDC) (at maximum volume) and the volume of the combustion chamber when the piston is at the top dead center (TDC) (at minimum volume). The volume of the combustion chamber when the piston is at the top dead center TDC is often referred as clearance volume Vc. The volume of the combustion chamber the piston travelled from BDC to TDC is often referred as displacement volume Vd, or swept volume. These definitions are also used in describing a compression chamber which compressing air.

Piston engines with different fuel types require different compression ratios in order to work properly for both compression and combustion. For example, the compression ratio for gasoline piston engine is 8:1 to 14:1, and for diesel is 15:1 to 25:1. If the compression ratio is increased to 50:1, none of the existing piston engines would work properly. In other words, none of the existing piston engines would work properly if the clearance volume Vc is less than $\frac{1}{50}$ Vd. If the clearance volume is less than $\frac{1}{50}$ Vd, the damaging piston knocking phenomena occurs for most types of fuel we are using today, such as gasoline, diesel, ethanol, or vegetable oils.

Due to restriction by the compression ratio in conventional piston engine, the positions of the in-cylinder peak pressure Pmax are often located at the crankshaft angles ATDC 10° CA to 20° CA when the crankshaft speed is below 1500 rotations per minute. At these crankshaft angles, only 20% to 40% of the force F1 on the piston generated by combustion expansion can be converted to tangential force F2 on crankshaft. The tangential force F2 is the only force that can drive the crankshaft to rotate.

Additionally, existing opposed piston engines function by installing two opposed pistons in two opposed cylinders, wherein the two pistons share a combustion chamber. The shortcomings in prior art relating to existing single piston engines also apply to these existing opposed engines. The basic principles are the same in both the prior art single piston engines and opposed piston engines.

Existing piston engines are generally designed according to the type of fuel they use. A piston engine can only use one type of fuel efficiently, for example, a gasoline engine which burns gasoline cannot achieve its effect by burning ethanol.

Therefore, there remains a need for novel piston engine which is no longer restricted by its compression ratio, independent of the type of fuel it uses, and improves its fuel efficiency.

SUMMARY OF THE INVENTION

The present disclosure relates to piston engine systems which are no longer restricted by their compression ratios. Rather, a fuel and pre-compressed air mixture is used to complete the combustion. The pressure of the compressed air is independently controlled. As a result, the piston engine systems can be used with different types of fuels, for example, gasoline, diesel, ethanol, or vegetable oils.

Furthermore, since the present invention is no longer restricted by the compression ratio, the position of the in-cylinder peak pressure Pmax of combustion can be moved to near ATDC 30° CA to 60° CA, as opposed to ATDC 10° CA to 20° CA of a traditional piston engine when the crankshaft speed is below 1500 rotations per minute, thereby increasing the tangential force F2 on crankshaft significantly.

The method and system as disclosed in the present invention solve the problems associated with existing traditional piston engines, wherein inter alia:

the clearance volume of the piston engine is significantly reduced to less than $\frac{1}{50}$ of its displacement volume, or to zero, which eliminates the restrictions of types of fuel on the compression ratio, so that the piston engine can use different types of fuel; and the position of the in-cylinder peak pressure Pmax of the combustion is moved closer to the Tmax position of the maximum crankshaft torque, thereby significantly improving the effective output torque on the crankshaft; and the air compression chamber can recover and store the kinetic energy from the moving crankshaft by the braking action of the piston to further improve fuel efficiency.

According to one aspect of the invention, there is provided a single piston engine system, comprising:

a cylinder defining an interior space therein, the cylinder encloses a combustion chamber, a piston configured to fit horizontally and sealingly in the cylinder and move vertically therewithin, and a compression chamber, wherein the upper face of the piston defines the bottom end of the combustion chamber and the lower face of the piston defines the top end of the compression chamber, the combustion chamber comprises an inlet valve connected to an output pipe of an air storage tank, the compression chamber comprises an outlet valve connected to an input pipe of the air storage tank and an intake valve connected to fresh air, a controller connected to a fuel tank, wherein according to the type of fuel in the fuel tank, the controller determines the required air pressure of the compression chamber via the intake valve, an extension rod connected to the lower face of the piston and extends through an aperture at the bottom of the cylinder, the extension rod is connected to a crankshaft via a connection rod, wherein fuel is pumped into the combustion chamber from the fuel tank and air is compressed as pressured air and injected into the compression chamber by its own pressure from the air storage tank, wherein combustion expansion and air compression are completed in a same downward stroke of the piston, wherein combustion expansion and air compression are completed in different chambers, wherein gas contained in the combustion chamber is discharged in an upward stroke of the piston, and wherein clearance volume of the combustion chamber is obtainable at less than $\frac{1}{50}$ of the combustion chamber displacement volume, clearance volume of the compression chamber is obtainable at less than $\frac{1}{50}$ of the compression chamber displacement volume, or both.

According to another aspect of at least one embodiment, there is provided an opposed piston engine system, comprising:

a first cylinder and a second cylinder, each defining an interior space therein, wherein the second cylinder is an inverted version of the first cylinder and is installed in an opposed position of the first cylinder, the first cylinder encloses a first compression chamber, a first piston configured to fit horizontally and sealingly in the first cylinder and move vertically therewithin, the second cylinder encloses a second compression chamber, a second piston configured to fit horizontally and sealingly in the second cylinder and move vertically therewithin, the first piston and the second piston are installed in an opposed position, wherein the first cylinder and second cylinder share a combustion chamber, wherein the upper face of the first piston defines the bottom end of the combustion chamber and the lower face of the first piston defines the top end of the first compression chamber, wherein the lower face of the second piston defines the top end of the combustion chamber and the upper face of the second piston defines the bottom end of the second compression chamber, the combustion chamber comprises an inlet valve connected to an output pipe of an air storage tank, the first compression chamber comprises a first outlet valve to an input pipe of the air storage tank and a first intake valve connected to fresh air, the second compression chamber comprises a second outlet valve to the input pipe of the air storage tank and a second intake valve connected to fresh air, a controller connected to a fuel tank, wherein according to the type of fuel in the fuel tank, the controller determines the required air pressures of the first and second compression chambers via the first and the second intake valves, a first extension rod connected to the lower face of the first piston and extends through an aperture at the bottom of the first cylinder, the first extension rod is connected to a first crankshaft via a first connection rod, a second extension rod connected to the upper face of the second piston and extends through an aperture at the top of the second cylinder, the second extension rod is connected to a second crankshaft via a second connection rod, wherein fuel is pumped into the combustion chamber from the fuel tank and air is compressed as pressured air and injected into the first and second compression chambers by its own pressure from the air storage tank, wherein combustion expansion and air compression are completed in a same stroke of the first piston, combustion expansion and air compression are completed in a same stroke of the second piston, wherein gas contained in the combustion chamber is discharged when the first piston and the second piston move from their bottom dead centers to their top dead centers, and wherein clearance volume of the combustion chamber is obtainable at less than 1/50 of the combustion chamber displacement volume, clearance volumes of the first and the second compression chambers are obtainable at less than 1/50 of the first and the second compression chambers displacement volumes respectively, or both.

According to a further aspect of at least one embodiment, there is provided an opposed piston engine system with phase shift in time and offset in position, comprising:

a first cylinder and a second cylinder, each defining an interior space therein, wherein the second cylinder is an inverted version of the first cylinder and is installed in an opposed position of the first cylinder, the first cylinder encloses a first compression chamber, a first piston configured to fit horizontally and sealingly in the first cylinder and move vertically therewithin, the second cylinder encloses a second compression chamber, a second piston configured to fit horizontally and sealingly in the second cylinder and move vertically therewithin, the first piston and the second piston are installed in an opposed position, wherein the first cylinder and second cylinder share a combustion chamber, wherein the upper face of the first piston defines the bottom end of the combustion chamber and the lower face of the first piston defines the top end of the first compression chamber, wherein the lower face of the second piston defines the top end of the combustion chamber and the upper face of the second piston defines the bottom end of the second compression chamber, the combustion chamber comprises an inlet valve connected to an output pipe of an air storage tank, the first compression chamber comprises a first outlet valve to an input pipe of the air storage tank and a first intake valve connected to fresh air, the second compression chamber comprises a second outlet valve to the input pipe of the air storage tank and a second intake valve connected to fresh air, a controller connected to an fuel tank, wherein according to the type of fuel in the fuel tank, the controller determines the required air pressures of the first and second compression chambers via the first and the second intake valves, a first extension rod connected to the lower face of the first piston and extends through an aperture at the bottom of the first cylinder, the first extension rod is connected to a first crankshaft via a first connecting rod, a second extension rod connected to the upper face of the second piston and extends through an aperture at the top of the second cylinder, the second extension rod is connected to a second crankshaft via a second connection rod, wherein fuel is pumped into the combustion chamber from the fuel tank and air is compressed as pressured air and injected into the first and second compression chambers by its own pressure from the air storage tank, wherein combustion expansion and air compression are completed in a same stroke of the first piston, combustion expansion and air compression are completed in a same stroke of the second piston, wherein gas contained in the combustion chamber is discharged when the first piston and the second piston move from their bottom dead centers to their top dead centers, wherein clearance volume of the combustion chamber is obtainable at less than 1/50 of the combustion chamber displacement volume, clearance volumes of the first and the second compression chambers are obtainable at less than 1/50 of the first and second compression chambers displacement volumes respectively, or both, wherein there is a phase shift in time between movement sequence of the first piston and the second piston, the first piston and the second piston reach their respective top dead center positions at different moments of time, wherein the first piston and the second piston have an offset with respect to their respective physical middle position, and push the respective top dead centre positions of the first piston and the second piston into the range of swept volume of each other, wherein combustion occurs in the combustion chamber and air compressions occur in the first and the second compression chambers, wherein tangential forces produced by a same combustion on the first crankshaft and the second crankshaft are different at any given moment before the position of Tmax of the first piston, and wherein at moment of ignition, positions of the first piston and the second piston are different in their respective crank angles.

According to an aspect of at least one embodiment, there is provided a single piston engine system, comprising:

a cylinder defining an interior space therein, the cylinder encloses a combustion chamber, a piston configured to fit horizontally and sealingly in the cylinder and move vertically therewithin, and a compression chamber, wherein the upper face of the piston defines the bottom end of the combustion chamber and the lower face of the piston defines the top end of the compression chamber, the combustion chamber comprises an inlet valve connected to an output pipe of an air storage tank and an exhaust valve, the compression chamber comprises an outlet valve connected to an input pipe of the air storage tank and an intake valve connected to fresh air, wherein when the air pressure in the compression chamber reaches a preset level of the outlet valve, the outlet valve opens and the pressured air are compressed into the air storage tank.

a fuel tank connected to a controller, wherein according to the type of fuel in the fuel tank, the controller determines the required air pressure in the compression chamber, the controller controls the intake valve of the compression chamber to cause the compression chamber to compress the fresh air, the air storage tank has a pressure sensor connected to the controller, wherein when the air pressure in the air storage tank reaches a certain level, the controller controls the intake valve of the compression chamber to stop compressing the fresh air, an extension rod connected to the lower face of the piston and extends through an aperture at the bottom of the cylinder, the extension rod is connected to a crankshaft via a connection rod, wherein when the piston moves near its top dead center TDC, the exhaust valve of the combustion chamber is shut off and the inlet valve of the combustion chamber is opened, a certain amount of compressed air in the air storage tank is led into the combustion chamber through the output pipe of the air storage tank and the inlet valve of the combustion chamber, and a certain amount of fuel is injected by a fuel pump into the combustion chamber, the fuel and the compressed air are mixed in the combustion chamber to produce a combustible gas mixture, wherein a spark plug in the combustion chamber ignites the combustible gas mixture in the combustion chamber to cause said mixture to combust and push the piston downward, and the piston pushes the extension rod of the piston downward, the extension rod in turn pushes the connection rod, the connection rod then drives the crankshaft, wherein combustion expansion and air compression occur in the same downward stroke, wherein clearance volume of the combustion chamber is obtainable at less than 1/50 of its displacement volume, clearance volume of the compression chamber is obtainable at less than 1/50 of its displacement volume, or both, wherein, when the piston moves from its TDC to BDC by combustion, the air in the compression chamber is compressed if the intake valve connected to the fresh air is shut off, the air in the compression chamber is not compressed if the intake valve connected to the fresh air is opened, wherein, when the piston moves from its TDC to BDC driven by the crankshaft, the air in the compression chamber is compressed if the intake valve connected to the fresh air is shut off and the piston is in braking action, and the kinetic energy from the moving crankshaft is recovered and stored into the compressed air, the air in the compression chamber is not compressed if the intake valve connected to the fresh air is opened and the piston is free moving.

According to another aspect of at least one embodiment, there is provided an opposed piston engine system, comprising:

a first cylinder and a second cylinder, each defining an interior space therein, wherein the second cylinder is an inverted version of the first cylinder and is installed in an opposed position of the first cylinder, the first cylinder encloses a first compression chamber, a first piston configured to fit horizontally and sealingly in the first cylinder and move vertically therewithin, the second cylinder encloses a second compression chamber, a second piston configured to fit horizontally and sealingly in the second cylinder and move vertically therewithin, the first piston and the second piston are installed in an opposed position, wherein the first cylinder and second cylinder share a combustion chamber, wherein the upper face of the first piston defines the bottom end of the combustion chamber and the lower face of the first piston defines the top end of the first compression chamber, wherein the lower face of the second piston defines the top end of the combustion chamber and the upper face of the second piston defines the bottom end of the second compression chamber, the combustion chamber comprises an inlet valve connected to an output pipe of an air storage tank and an exhaust valve, the first compression chamber comprises a first outlet valve connected to an input pipe of the air storage tank, the second compression chamber comprises a second outlet valve connected to the input pipe of the air storage tank, the first compression chamber comprises a first intake valve connected to fresh air, the second compression chamber comprises a second intake valve connected to fresh air, wherein when the air pressure in the first and second compression chambers reach preset levels of the first and second outlet valves respectively, the first and second outlet valves open respectively and the pressured air are compressed into the air storage tank, a fuel tank connected to a controller, wherein according to the type of fuel in the fuel tank, the controller determines the required air pressure of the first and second compression chambers, the controller controls a first intake valve of the first compression chamber and the second intake valve of the second compression chamber to cause the first and second compression chambers to compress the fresh air, the air storage tank has a pressure sensor connected to the controller, wherein when the air pressure in the air storage tank reaches a certain level, the controller controls the first and second intake valves of the first and second compression chambers to stop compressing the fresh air, a first extension rod connected to the lower face of the first piston and extends through an aperture at the bottom of the first cylinder, the first extension rod is connected to a first crankshaft via a first connection rod, a second extension rod connected to the upper face of the second piston and extends through an aperture at the top of the second cylinder, the second extension rod is connected to a second crankshaft via a second connection rod, wherein when the first and second pistons move near their respective top dead center positions, the exhaust valve of the combustion chamber is shut off and the inlet valve of the combustion chamber is opened, a certain amount of compressed air in the air storage tank is led into the combustion chamber through the output pipe of the air storage tank and the inlet valve of the combustion chamber, and a certain amount of fuel is injected by a fuel pump into the combustion chamber, the fuel and the compressed air are mixed in the combustion chamber to produce a combustible gas mixture, wherein a spark plug in the combustion chamber ignites the combustible gas mixture in the combustion chamber to cause said mixture to combust and (1) push the first piston downward, the first extension rod in turn pushes the first connection rod, the first connection rod then drives the first crankshaft, (2) push the second piston upward, the second extension rod in turn pushes the second connection rod, the second connection rod then drives the second crankshaft, wherein after the first and second pistons reach their respective bottom dead center positions, the first and second crankshafts drive the first and second pistons move to their respective top dead centers through the first and second extension rods and the first and second connection rods, the exhaust valve of the combustion chamber is opened, the exhaust gas contained in the combustion chamber is discharged, wherein the first crankshaft and the second crankshaft operate at the same rotating speed and in the same rotating direction, wherein clearance volume of the combustion chamber is obtainable at less than $\frac{1}{50}$ of displacement volume of the combustion chamber, clearance volumes of the first and second compression chambers are obtainable at less than $\frac{1}{50}$ of their displacement volumes of the first and second compression chambers respectively, or both, wherein, when the first and second pistons move from their TDC to BDC positions by combustion, the air in the first and second compression chambers are compressed if the intake valves connected to the fresh air are shut off, the air in the first and second compression chambers are not compressed if the intake valves connected to the fresh air are opened, wherein, when the first and second pistons move from their TDC to BDC positions by their respective crankshafts, the air in the first and second compression chambers are compressed if the intake valves connected to fresh air are shut off and the pistons are in braking actions and the kinetic energy from crankshafts are recovered and stored in the compressed air, the air in the first and second compression chambers are not compressed if the intake valves connected to fresh air is opened and the pistons are in free moving.

According to a further aspect of at least one embodiment, there is provided an opposed piston engine system with phase shift in time and offset in position, comprising:

a first cylinder and a second cylinder, each defining an interior space therein, wherein the second cylinder is an inverted version of the first cylinder and is installed in an opposed position of the first cylinder, the first cylinder encloses a first compression chamber, a first piston configured to fit horizontally and sealingly in the first cylinder and move vertically therewithin, the second cylinder encloses a second compression chamber, a second piston configured to fit horizontally and sealingly in the second cylinder and move vertically therewithin, the first piston and the second piston are installed in an opposed position, wherein the first cylinder and second cylinder share a combustion chamber, wherein the upper face of the first piston defines the bottom end of the combustion chamber and the lower face of the first piston defines the top end of the first compression chamber, wherein the lower face of the second piston defines the top end of the combustion chamber and the upper face of the second piston defines the bottom end of the second compression chamber, the combustion chamber comprises an inlet valve connected to an output pipe of an air storage tank and an exhaust valve, the first compression chamber comprises a first outlet valve to an input pipe of the air storage tank, the first compression chamber comprises a first intake valve connected to fresh air, the second compression chamber comprises a second outlet valve to the input pipe of the air storage tank, the second compression chamber comprises a second intake valve connected to the fresh air, a fuel tank connected to a controller, wherein according to the type of fuel in the fuel tank, the controller determines the required air pressure of the compression chambers, the controller controls a first intake valve of the first compression chamber and the second intake valve of the second compression chamber to cause the first and second compression chambers to compress fresh air, the air storage tank has a pressure sensor connected to the controller, wherein when the air pressure in the air storage tank reaches a certain level, the controller controls the first and second intake valves of the first and second compression chambers to stop compressing fresh air, a first extension rod connected to the lower face of the first piston and extends through an aperture at the bottom of the first cylinder, the first extension rod is connected to a first crankshaft via a first connection rod, a second extension rod connected to the upper face of the second piston and extends through an aperture at the top of the second cylinder, the second extension rod is connected to a second crankshaft via a second connection rod, wherein the first piston reaches its top dead center earlier than that of the second piston, when the second piston is moving near its top dead center, the exhaust valve of the combustion chamber is shut off and the inlet valve of the combustion chamber is opened, a certain amount of compressed air in the air storage tank is led into the combustion chamber through the output pipe of the air storage tank and the inlet valve of the combustion chamber, and a certain amount of fuel is injected by a fuel pump into the combustion chamber, the fuel and the compressed air are mixed in the combustion chamber to produce a combustible gas mixture, wherein when the second pistons is near its top dead center, a spark plug in the combustion chamber ignites the combustible gas mixture in the combustion chamber to cause said mixture to combust and (1) push the first piston downward, the first extension rod in turn pushes the first connection rod, the first connection rod then drives the first crankshaft, and (2) push the second piston upward, the second extension rod in turn pushes the second connection rod, the second connection rod then drives the second crankshaft, wherein when the first piston passes its bottom dead center, the first crankshaft drives the first piston upward through the first extension rod and first connection rod, wherein when the second piston moves near its bottom dead center, the exhaust valve of the combustion chamber is opened, the second crankshaft drives the second piston downward through the second extension rod and second connection rod, wherein there is a phase shift in time between movement sequence of the first piston and the second piston, the first piston and the second piston reach their respective top dead center positions at different moments of time, wherein the first piston and the second piston have an offset at their respective physical positions, the offset pushes the respective top dead centre positions of the first piston and the second piston into the range of swept volume of each other, where the first piston and the second piston have an partly overlapped swept volume, the offset is to obtain a certain preferable combustion chamber volume, wherein clearance volume of the combustion chamber is obtainable at less than $1/50$ of the displacement volume of combustion chamber, clearance volumes of the first and second compression chambers are obtainable at less than $1/50$ of their displacement volumes of the first and second compression chambers respectively.

Other features and advantages of the present invention will become apparent from the following detailed description and the accompanying drawings, which illustrate, by way of example, the principles of the invention.

BRIEF DESCRIPTION OF THE DRAWINGS

By way of example only, preferred embodiments of the present invention are described hereinafter with reference to the accompanying drawings, wherein.

DETAILED DESCRIPTION OF THE INVENTION

It is to be understood that the disclosure is not limited in its application to the details of the embodiments as set forth in the following description. The invention is capable of other embodiments and of being practiced or of being carried out in various ways.

Furthermore, it is to be understood that the terminology used herein is for the purpose of description and should not be regarded as limiting. Contrary to the use of the term "consisting", the use of the terms "including", "containing", "comprising", or "having" and variations thereof is meant to encompass the items listed thereafter and equivalents thereof as well as additional items. The use of the term "a" or "an" is meant to encompass "one or more". Any numerical range recited herein is intended to include all values from the lower value to the upper value of that range.

The term "clearance volume" used herein does not include the "valve sets crevice volumes, spark plug crevice volume, piston ring crevice volume, cylinder gasket crevice volume". The term "offset" used herein means "overlap or overlapped". Mechanical friction forces are not included in the description.

The description of the invention is in the context that the crankshaft speed is below 1500 rotations per minute.

A cylinder has three faces—two circular faces (i.e., a top circular face and a bottom circular face parallel to each other) and a sidewall face extending between the top and bottom circular faces and that is normal to the planes of the top and bottom circular faces. When describing the piston, the term "horizontally" means the upper and lower faces of the piston are parallel to the planes of the cylinder's top and bottom circular faces, and the term "vertically" means the piston moves along the direction that is normal to the planes of the cylinder's top and bottom circular faces. A person skilled in the art would understand that a cylinder may be placed in any orientation that is suitable.

List of Symbols

Figure 1:
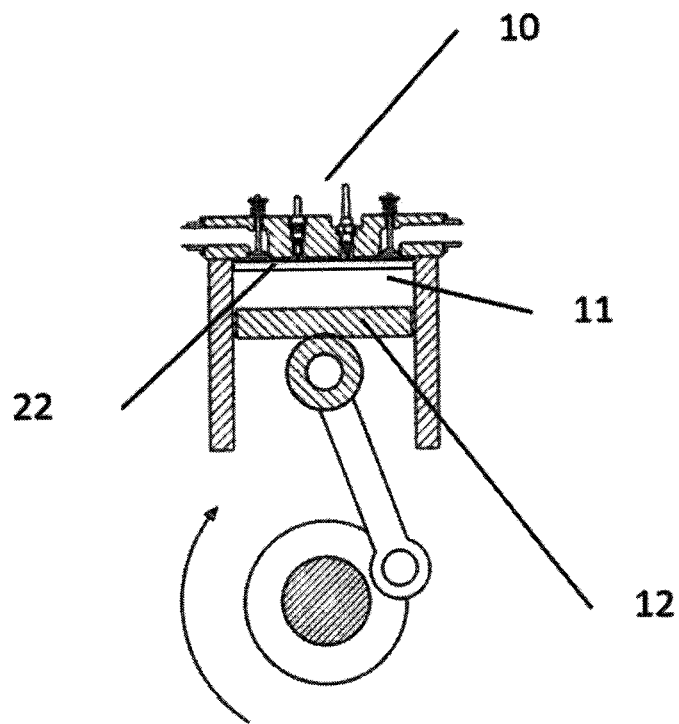
FIG. 1 is an illustration of an existing traditional piston engine (prior art)

V combustion/or compression chamber volume
Vc clearance volume
Vd displacement volume
a crank angle, or CA
b connection rod angle
F1 vertical force on piston
F2 tangential force on crankshaft
T torque on crankshaft, wherein T=F2×R
Pmax in-cylinder peak pressure
Vpk combustion chamber volume at the point of Pmax
Tmax maximum torque on crankshaft at given F1
R crank throw, wherein 2R=stroke=displacement
L connection rod length
TDC top dead center
BDC bottom dead center
ATDC after top dead center FIG. 1 depicts an existing conventional piston engine 10. Referring to FIG. 1, when in action, piston 12 moves on its first downward stroke, the intake valve opens to allow a mixture of air and fuel to fill the combustion chamber 11. Next, the intake valve closes and the piston 12 moves on an upward stroke that compresses the air/fuel mixture. The spark plug ignites the air/fuel mixture causing it to combust, which forces the piston 12 into another downward stroke. As the piston begins its second upward stroke, the exhaust valve opens and the burned air/fuel mixture is forced out of the combustion chamber through the exhaust valve. The clearance volume Vc 22 is generally from $1/25$ to $1/8$ of its displacement volume Vd. The clearance volume Vc is no less than $1/50$ Vd, and cannot be zero because the damaging piston knocking phenomena.

Embodiment in a Single Piston Engine

According to the present invention, a single piston engine system works comprising the following steps: (1) generating compressed air, (2) mixing a fuel with the pre-compressed air from (1) to form a combustible gas mixture, and (3) igniting the combustible gas mixture at a certain time.

Figure 2:
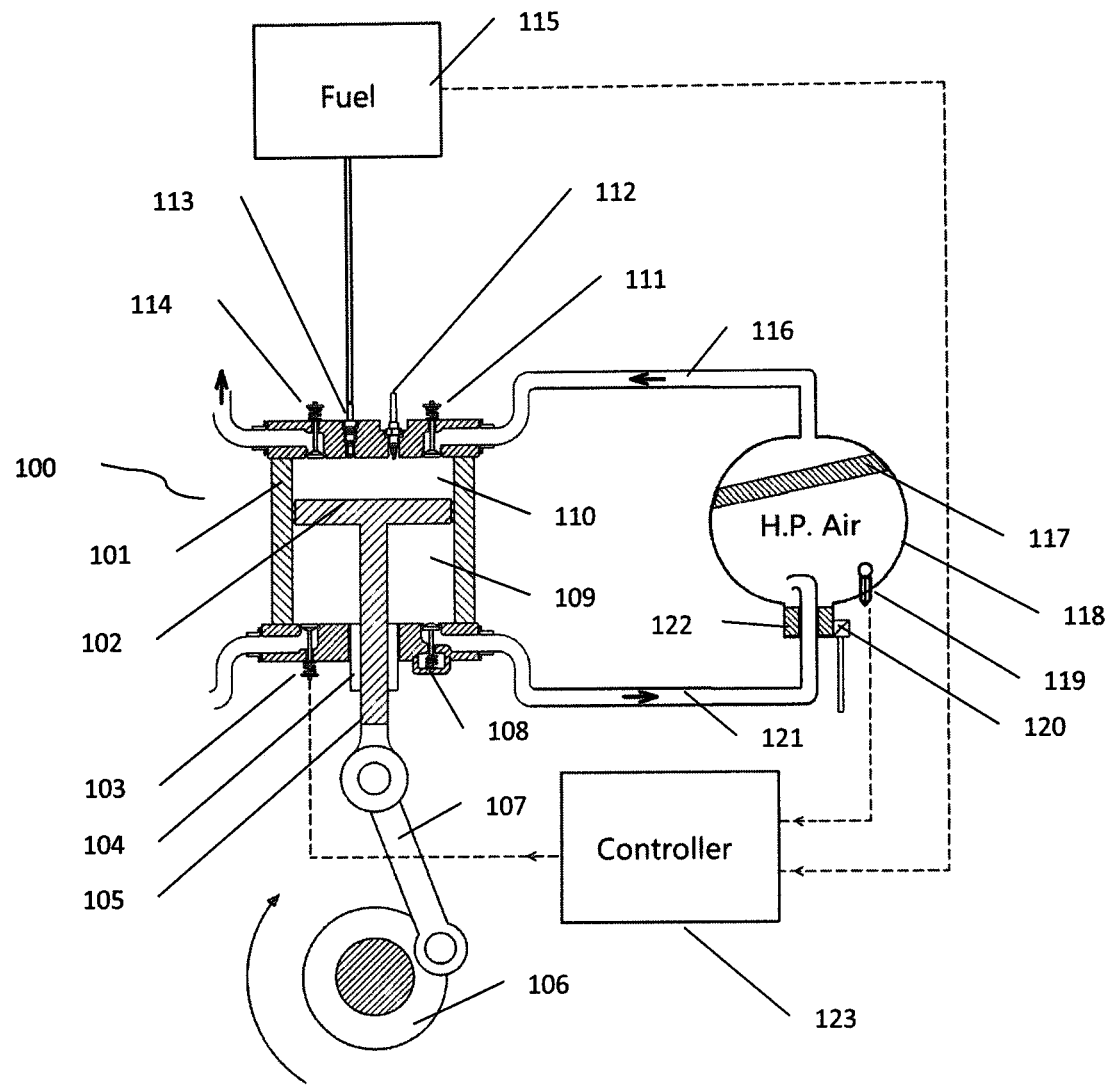
FIG. 2 is an embodiment of the present invention in a single piston engine system.

Referring to FIG. 2, which depicts a single piston engine system according to the present invention, the system comprises a piston engine 100. The clearance volume of the piston engine 100 is less than $1/50$ of the displacement volume or can be zero.

Preferably, piston engine 100 comprises a cylinder 101 which encloses a compression chamber 109 and a combustion chamber 110. The combustion chamber 110 has an inlet valve 111 which is connected to an output pipe 116 of an air storage tank 118. The compression chamber 109 has an outlet valve 108 which is connected to an input pipe 121 of the air storage tank 118.

Fuel tank 115 is connected to a controller 123 which controls an intake valve 103 of the compression chamber 109.

According to the type of fuel used in the fuel tank 115, a signal is sent to the controller 123, which then determines the required air pressure of the compression chamber 109. The controller 123 controls the actions of the intake valve 103 of the compression chamber 109 to cause the compression chamber 109 to compress certain amount of fresh air.

Air storage tank 118 has a pressure sensor 119 which is connected to the controller 123. When the air pressure in the air storage tank 118 reaches a certain required level, the controller 123 controls the intake valve 103 to stop compressing the fresh air.

Referring again to FIG. 2, the cylinder 101 has a top circular face and a bottom circular face parallel to each other. The cylinder 101 contains a piston 102 which can move up and down. The piston 102 has an upper face and a lower face. The piston is configured to fit horizontally (i.e. the upper and lower faces of the piston are parallel to the planes of the cylinder's top and bottom circular faces) and sealingly in the cylinder and move vertically (i.e. the piston moves along the direction that is vertically to the planes of the cylinder's top and bottom circular faces) therewithin.

When the piston 102 moves up and is near its top dead center (TDC) position, an exhaust valve 114 of the combustion chamber is shut off and the inlet valve 111 of the combustion chamber is opened. A certain amount of compressed air in the air storage tank 118 is then led into the combustion chamber 110 through the output pipe 116 of the air storage tank and the inlet valve 111 of the combustion chamber. A certain amount of fuel is injected by fuel pump 113 into the combustion chamber 110. Said fuel and pressured air are mixed in the combustion chamber 110 to produce a combustible gas mixture. Then, spark plug 112 ignites the combustible gas mixture in the combustion chamber 110 to cause said mixture to combust and expand.

When the combustible gas mixture in the combustion chamber 110 combusts and expands, it pushes the piston 102 downward and pushes the extension rod of the piston 105 downward. The extension rod 105 then pushes the connection rod 107 which connects the extension rod 105 and crankshaft 106. The connection rod 107 then drives the crankshaft 106.

After the piston 102 reaches its BDC position, the crankshaft 106 drives the piston 102 upward through the connection rod 107 and extension rod 105.

When the piston 102 moves downward, if the intake valve 103 of the compression chamber is shut off, the air in the compression chamber 109 is compressed. When the pressure difference of the compressed air is greater than a preset pressure of the outlet valve 108 of the compression chamber, the outlet valve 108 is opened and the compressed air is let out through the outlet valve 108 and then the input pipe 121 into air storage tank 118.

When the piston 102 moves downward, if the intake valve 103 of the compression chamber is opened, the air in the compression chamber 109 is not compressed.

The extension rod 105 is sealed by a sealed sliding ring 104. The extension rod 105 can move up and down freely and is air-tightened to prevent the compressed air in the compression chamber 109 from leaking out.

The piston 102 can be moved upward from the bottom dead center (BDC) position by the crankshaft 106, and then the exhaust valve 114 of the combustion chamber is opened and the exhaust gas (the burned air and fuel) in the combustion chamber 110 is discharged.

When the piston 102 moves upward from the bottom dead center (BDC) position, if the intake valve 103 of the compression chamber is opened, the compression chamber 109 intakes the fresh air.

The air storage tank 118 is a pressure vessel capable of withstanding high pressure. The air storage tank 118 comprises an oil-gas separation element 117 to separate the lubricating oil from the compressed air in order to prevent the lubricating oil from entering into the combustion chamber 110.

At the lower extremity of the air storage tank 118, there is an oil storage tank 122 for storing the collected lubricating oil. The collected lubricating oil can be then discharged from the oil storage tank 122 through drain valve 120.

Although not shown in FIG. 2, it is understood that the compressed air in the air storage tank 118 can also be mixed with fuel before being led into the combustion chamber 110.

The controller 123 controls the operation of the intake valve 103 of the compression chamber in the following orders:

When the piston 102 is during a downward stroke:
If the combustion chamber 110 is expanded by combustion and the intake valve 103 of the compression chamber is shut off, the compression chamber 109 compresses the air contained therein.
If the combustion chamber 110 is expanded by combustion and the intake valve 103 of the compression chamber is open, the compression chamber 109 does not compress the air contained therein (free moving without compression).
If the combustion chamber 110 does not expand by combustion but in motoring action driven by the crankshaft 106 and the intake valve 103 of the compression chamber is shut off, the compression chamber 109 compresses the air contained therein, and the piston engine 100 is in a braking action, then the kinetic energy from the crankshaft is recovered and stored in the compressed air.
If the combustion chamber 110 does not expand by combustion but in motoring action driven by the crankshaft 106 and the intake valve 103 of the compression chamber is open, the compression chamber 109 does not compress the air contained therein (free moving without compression).
The opening and/or shutting off of the intake valve 103 of the compression chamber can be advanced or delayed in time by various intervals, so that the compression chamber 109 can generate compressed air with various volumes and at different pressures.
When the piston 102 is during an upward stroke: the compression chamber intakes the fresh air if the intake valve 103 of the compression chamber is opened, the compression chamber stops intaking the fresh air if the intake valve 103 of the compression chamber is shut off.

Preferably, the inside wall of the cylinder 101 and/or the piston 102 are lubricated with lubricating oil, which is not shown in FIG. 2.

Preferably, air entering the compression chamber 109 through the intake valve 103 of the compression chamber is natural fresh air, or compressed air from a turbocharger, or air mixed with exhaust gas recirculation (EGR), which is not shown in FIG. 2.

For different fuels, the air storage tank 118 may set at different air pressures, as illustrative and non-exhaustive examples: gasoline is 20 bar, diesel is 30 bar, ethanol is 23 bar, etc.

In choosing the air pressure, one needs to take into consideration the timing and the amount of the compressed air to be injected, the timing and the amount of the fuel to be injected, the timing of ignition of the spark plug, and other factors. The piston engine as described in the present invention can therefore use different fuels, for example, gasoline, diesel, ethanol, methanol, vegetable oil, etc.

Because compression of the air/fuel mixture is not taking place in the combustion or the compression chamber, there is no piston knocking phenomena when the clearance volume is less than 1/50 Vd. This is in contrast to a conventional piston engine, where piston knocking always occurs if the clearance volume is less than 1/50 Vd.

According to the present invention, the position of in-cylinder peak pressure (Pmax) can also be controlled by ignition time, thereby improving the tangential force F2 on crankshaft and increasing the effective output torque. More particularly, the Pmax position can be moved closer to the Tmax position to increase tangential force F2 on crankshaft.

Table 1 below is a comparison chart of an existing conventional piston engine versus the single piston engine according to the present invention:

TABLE 1

| Existing Conventional Piston Engine 10 | Present Invention Piston Engine 100 |
|---|---|
| Air and fuel are compressed after they are mixed in the combustion chamber 11, they are compressed into the clearance volume Vc 22. | The air has been compressed (pre-compressed air) before entering the combustion chamber 110. Fuel and the pre-compressed air are injected into the combustion chamber. |
| Both compression and combustion are performed in the combustion chamber 11. | Compression and combustion are performed separately in the compression chamber 109 and the combustion chamber 110. |
| Compression and combustion expansion are done in different strokes. | Compression and combustion expansion are done in same stroke. |
| Compression: upward stroke. Combustion: downward stroke. | Compression: downward stroke. Combustion: downward stroke. |
| Combustion chamber 11 must have a minimum clearance volume Vc 22 to contain compressed air and fuel mixture. This space cannot be zero. | Combustion chamber 110 has no minimum clearance volume limit. Compression chamber 109 has no minimum clearance volume limit. |
| Piston knocking occurs when Vc is less than 1/50 Vd. | No piston knocking occurs when Vc is less than 1/50 Vd. |
| Ignition occurs before top dead center | Ignition occurs after top dead center |
| Pmax position is usually less than ATDC 20° CA due to Vc restriction. | Pmax position can be larger than ATDC 30° CA due to no Vc restriction. |

Figure 3A:
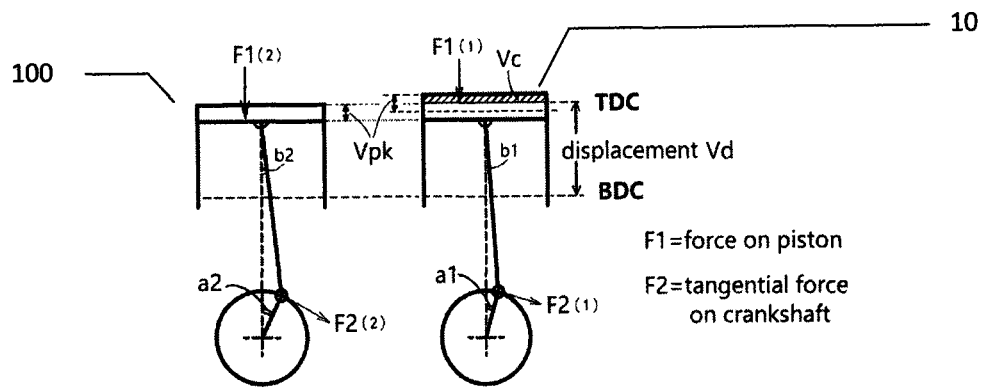
FIGS. 3A-3C show L/R ratio, clearance volume, tangential force and crank angle of different single piston engines.
Figure 3B:
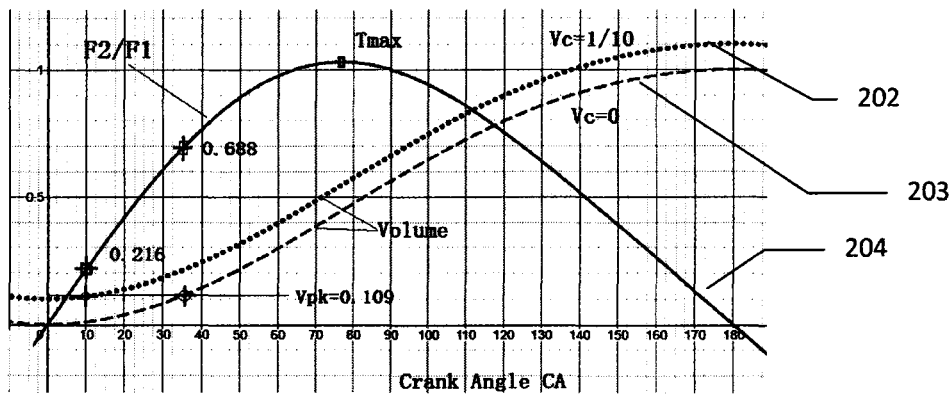
Figure 3C:
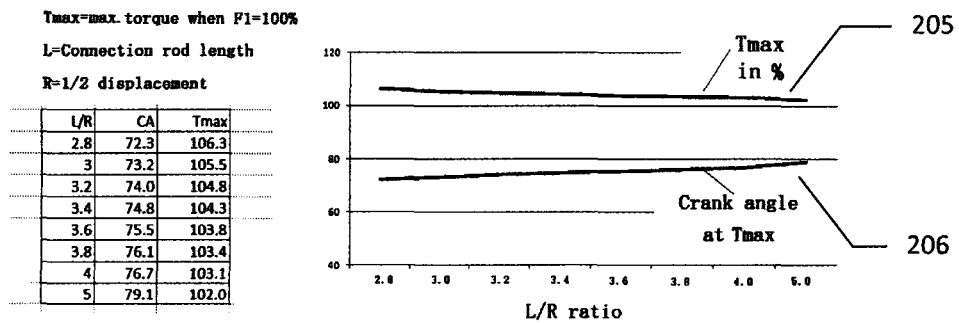

FIGS. 3A-3C show several parameters, for example, L/R ratio, clearance volume, tangential force and crank angle of different single piston engines.

FIG. 3A shows comparison of (1) the piston engine 100 according to the present invention with clearance volume (Vc)=0, and (2) the existing conventional piston engine 10 with clearance volume (Vc)>0.

Table 2 below is a comparison chart of the existing conventional piston engine versus the single piston engine according to the present invention, as shown in FIG. 3B:

TABLE 2

| Existing Conventional Piston Engine 10 | Present Invention - Piston Engine 100 |
|---|---|
| Vc > 0 | Vc = 0 |
| Vc > 0, F2/F1 is smaller than piston engine 100 at the same combustion volume Vpk. | Vc = 0, F2/F1 is bigger than piston engine 10 at the same combustion volume Vpk. |

Referring to FIG. 3B:

Curve 202 shows the relationship between combustion volume V and crankshaft angle for piston engine 10 when Vc=1/10 Vd; and Curve 203 shows the relationship between combustion volume V and crankshaft angle for piston engine 100 when Vc=0.

Comparing curve 202 of engine 10 and curve 203 of engine 100, wherein piston engine 10 and piston engine 100 have the same displacement volume Vd but are different in clearance volumes Vc (Vc=1/10 vs. Vc=0), suppose the in-cylinder peak pressure Pmax occurs at a certain point where Vpk=0.109Vd for both engine 10 and engine 100, corresponding to this Vpk, engine 10 is at its ATDC 10° CA position and engine 100 is at ATDC 34.7° CA position, F2/F1 is 21.6% for piston engine 10 and F2/F1 is 68.8% for piston engine 100 respectively.

In the above example, the peak pressures (Pmax) of piston engine 100 and 10 are the same, their corresponding combustion chamber volumes (Vpk) are the same, that means the fuel consumed are the same, but the tangential force F2 on crankshaft of piston engine 100 is increased by 219% compared to F2 of engine 10.

Table 3 below is a comparison table of various parameters of piston engine 100 and piston engine 10 as shown in FIG. 3B:

TABLE 3

| Single Piston Engine L/R = 4/1 | piston engine 10 Vc = 1/10 | piston engine 100 Vc = 0 |
|---|---|---|
| Engine strokes | 4 | 2 |
| Piston displacement Volume | Vd = 100% | Vd = 100% |

TABLE 3-continued

| Single Piston Engine<br>L/R = 4/1 | piston engine 10<br>Vc = 1/10 | piston engine 100<br>Vc = 0 |
|---|---|---|
| Combustion volume Vpk | 10.9% | 10.9% |
| Compression ratio | 1/11 | N/A |
| Clearance Volume | 1/10 | 0 |
| Max. air pressure w/o ignition | 20 bar | 20 bar |
| Peak in-cylinder pressure | 50 bar | 50 bar |
| Start of ignition position | −20° CA | 4.7° CA |
| In-cylinder peak pressure position | 10° CA | 34.7° CA |
| Fuel consumption | 1 unit | 1 unit |
| F2/F1 at Vpk | 21.6% | 68.8% |

For each piston engine, there is a specific piston Tmax position where force F1 on piston can produce the largest tangential force F2 on the crankshaft, and in turn produce the largest torque on the crankshaft. Only tangential force F2 on crankshaft can produce effective output torque.

Referring to FIG. 3B, curve 204 is an illustrative example that shows the relationship of F2/F1 and the position of the piston crankshaft angle. The position of piston is represented by crank angle CA, which corresponds to the horizontal axis of curve 204. In this example, the maximum torque Tmax on crankshaft is near the position of 77° CA, and the maximum value of F2/F1 is about 103%.

Different piston engines have different sizes of connection rod length (L) and different sizes of crankshaft throw (R). The maximum torque (Tmax) corresponding to different L/R is different.

Referring to FIG. 3C, curve 205 shows the relationship of maximum torque Tmax with crankshaft L/R, the bigger the L/R value, the smaller the Tmax can be obtained. Curve 206 shows the positions of the crankshaft that produce the maximum torque Tmax vs. different L/R, the bigger the L/R value, the bigger the corresponding crank angle where the Tmax is reached, this is assuming that the forces (F1) applied on the pistons are the same.

Therefore, the piston engine 100 as described hereinabove is configured such that the combustion is achieved by igniting fuel and the mixture of the compressed air, and its clearance volume Vc can be less than ⅕₀ Vd, or even at zero, which is no longer limited by the compression ratio as in a conventional piston engine. Due to the reduction or elimination of clearance volume Vc, the position corresponding to the same Vpk is closer to the position of Tmax, the tangential force F2 on crankshaft is increased. This means that burning the same amount of fuel can produce a larger and more effective torque T=F2×R. In other words, the present invention moves the in-cylinder peak pressure combustion position towards its Tmax position to increase the output torque without increasing fuel consumption.

Embodiment of the Invention in an Opposed Piston Engine

According to the present invention, an opposed piston engine system works comprising the following steps: (1) generating compressed air, (2) mixing a fuel with the precompressed air from (1) to form a combustible gas mixture, and (3) igniting the mixture gas at a certain moment of time.

Figure 4:
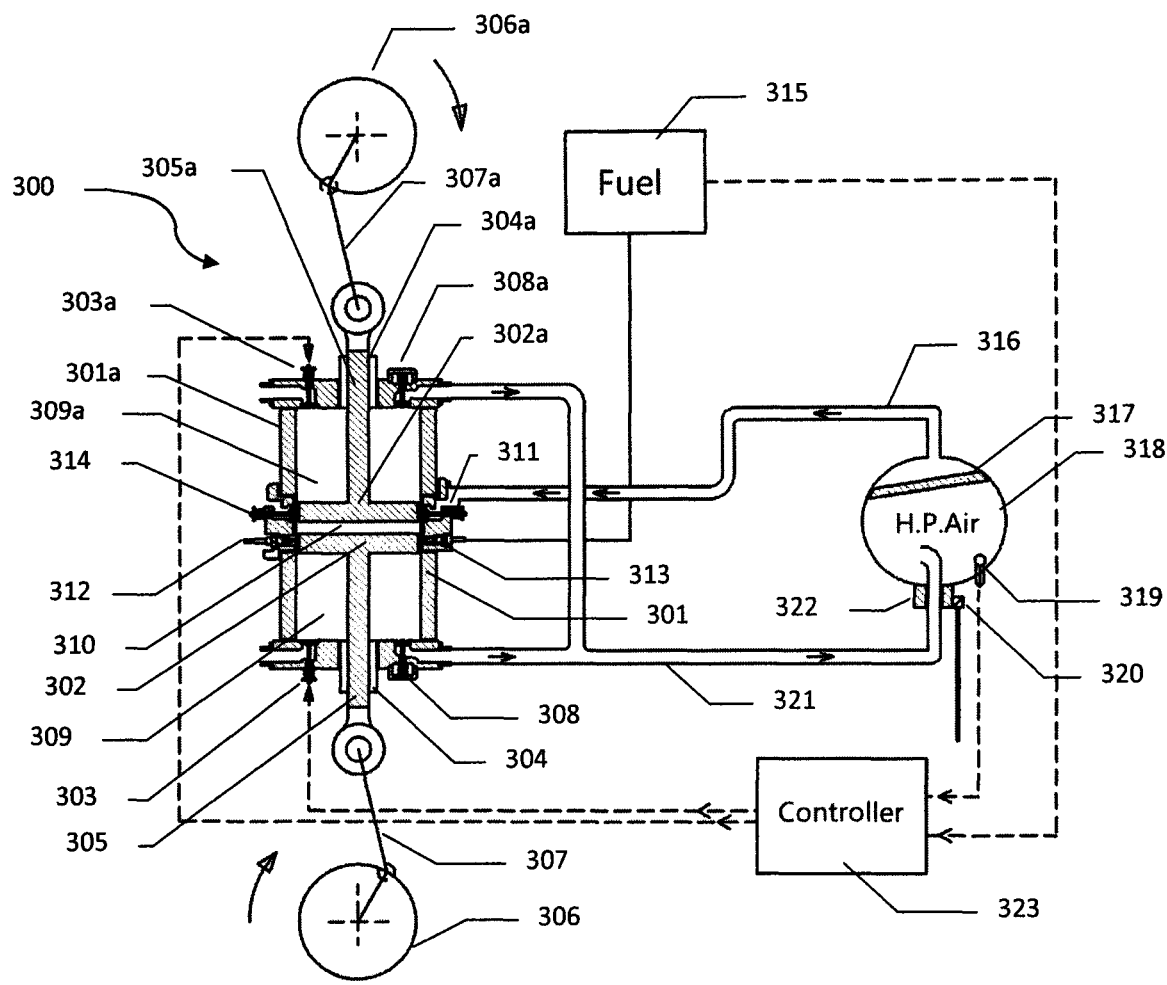
FIG. 4 is an embodiment of the present invention in an opposed piston engine system.

Referring to FIG. 4, an opposed piston engine system comprises an opposed piston engine 300. Wherein the clearance volume of piston engine 300 is less than ⅕₀ of the displacement volume or can be zero.

The basic principles described in engine 100 are applicable to the opposed piston engine 300.

Preferably, opposed piston engine 300 has a cylinder 301 and a cylinder 301a. Cylinder 301 and cylinder 301a can be integrated or separated. Cylinder 301 and cylinder 301a are installed in an opposed position.

Cylinder 301 and cylinder 301a each has a piston 302 and a piston 302a, respectively, they are installed in an opposed position relative to each other.

Cylinder 301 has a compression chamber 309, cylinder 301a has a compression chamber 309a, and cylinder 301 and cylinder 301a share a combustion chamber 310.

The clearance volumes of the piston 302 and the piston 302a can be less than ⅕₀ of the displacement volume or can be zero in their respective combustion chamber and/or compression chambers.

The piston 302 and piston 302a are connected to their respective crankshafts 306 and 306a through their respective extension rods 305 and 305a and their respective connection rods 307 and 307a.

Crankshafts 306 and 306a operate at the same rotating speed and in the same rotating direction.

An inlet valve 311 of the combustion chamber 310 is connected to the output pipe 316 of an air storage tank 318.

An outlet valve 308 and an outlet valve 308a of the compression chambers 309 and 309a are connected to an input pipe 321 of the air storage tank 318.

An intake valve 303 and an intake valve 303a of the compression 309 and 309a respectively are connected to fresh air.

Referring to FIG. 4, according to the fuel type used in fuel tank 315, a signal is sent to controller 323, which determines the required air pressure of the compression chambers 309 and 309a. Controller 323 controls the actions of the intake valves 303 and 303a of compression chambers 309 and 309a, respectively, to generate compressed air of different pressures and volumes. Air storage tank 318 has a pressure sensor 319 connected to the controller 323. When the air pressure in the air storage tank 318 reaches a certain level, the controller 323 controls the intake valves 303 and 303a to stop compressing the fresh air.

When the first piston 302 and the second piston 302a move near their respective top dead centers, an exhaust valve 314 of the combustion chamber is shut off and the inlet valve 311 of the combustion chamber is opened. A certain amount of compressed air in the air storage tank 318 is led into the combustion chamber 310 through the output pipe 316 of the air storage tank and the inlet valve 311 of the combustion chamber. A certain amount of fuel is injected by fuel pump 313 into the combustion chamber 310. Said fuel and the compressed air are mixed in the combustion chamber 310 to produce a combustible gas mixture. Then, a spark plug 312 ignites the combustible gas mixture in the combustion chamber 310 to cause said mixture to combust and expand.

When the combustible gas mixture in the combustion chamber 310 combusts and expands, it pushes the piston 302 downward, and pushes the extension rod 305 of the piston downward, the extension rod 305 then pushes connection rod 307 which connects the extension rod 305 and crankshaft 306; and connection rod 307 then drives the crankshaft 306.

When the piston 302 moves downward, if the intake valve 303 of the compression chamber is shut off, the air in the compression chamber 309 is compressed. When the pressure difference of the compressed air is greater than a preset pressure of the outlet valve 308 of the compression chamber, the outlet valve 308 of the compression chamber is opened and the compressed air is led through the outlet valve 308 and the input pipe 321 into the air storage tank 318.

When the piston 302 moves downward, if the intake valve 303 of the compression chamber is opened, the air in the compression chamber 309 is not compressed.

Extension rod 305 is sealed by a sealed sliding ring 304. Extension rod 305 can move up and down freely and is air-tightened to prevent the compressed air of the compression chamber 309 from leaking out.

Extension rod 305a is sealed by a sealed sliding ring 304a. Extension rod 305a can move up and down freely and is air-tightened to prevent the compressed air in the compression chamber 309a from leaking out.

When the piston 302 moves upward from its bottom dead center (BDC) position in motoring action, that is, the crankshaft 306 drives the piston 302 upward. The exhaust valve 314 of the combustion chamber is opened and the exhaust gas (burned air and fuel) in the combustion chamber 310 is discharged.

When the piston 302 moves upward from the bottom dead center (BDC) position, if the intake valve 303 of the compression chamber is opened, and the compression chamber 309 intakes the fresh air.

Air storage tank 318 is a pressure vessel capable of withstanding high pressure. Air storage tank 318 has an oil-gas separation element 317 to separate the lubricating oil from the compressed air in order to prevent the lubricating oil from entering the combustion chamber 310. At the lower extremity of the air storage tank 318, there is an oil storage tank 322 for storing the collected lubricating oil. The collected lubricating oil can then be discharged from the oil storage tank 322 through drain valve 320.

Although not shown in FIG. 4, it is understood that the compressed air in the air storage tank 318 can also be mixed with fuel before being led into the combustion chamber 310.

Preferably, the inside walls of the cylinder bodies 301, 301a and/or the pistons 302 and 302a are lubricated with lubricating oil, which is not shown in FIG. 4.

Preferably, air entering the compression chambers 309 and 309a through the intake valves 303 and 303a of the compression chamber may be natural fresh air, compressed air from a turbocharger, or air mixed with exhaust gas recirculation (EGR), which is not shown in FIG. 4.

Figure 5:
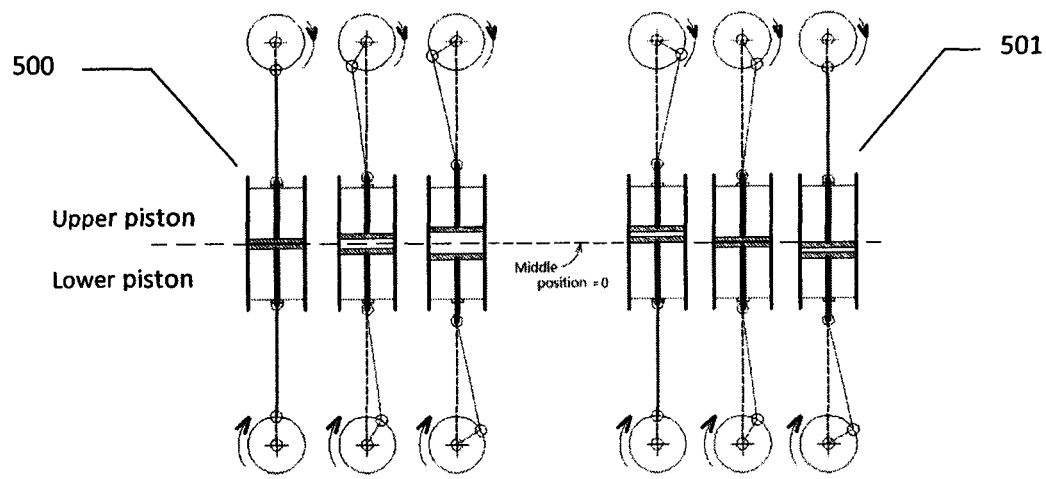
FIG. 5 shows the comparison of an embodiment of an opposed engine without phase shift and position overlapped versus an embodiment of an opposed engine with phase shift and position overlapped.

An opposed engine 500 in FIG. 5 shows the relations of piston 302 and piston 302a and their connected parts (extension rods, connection rods, crankshafts) of the invention. An upper piston refers to piston 302a, and a lower piston refers to piston 302.

Figure 6:
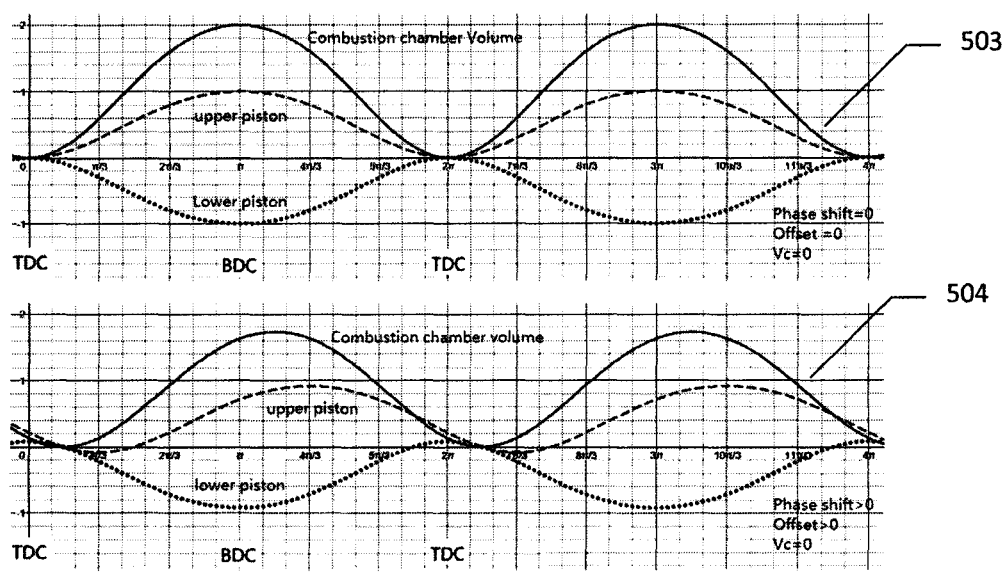
FIG. 6 illustrate the relationship between combustion volume and crankshaft angle of an embodiment of an opposed engine without phase shift and position overlapped versus an embodiment of an opposed engine with phase shift and position overlapped.

Curves 503 in FIG. 6 show the detailed relations in time domain of piston 302 and piston 302a and their related characteristics (piston positions, combustion chamber volumes, and crankshaft angles) of the invention. The upper piston refers to piston 302a, and the lower piston refers to piston 302.

The cylinder 301a, piston 302a, extension rod 305a, connection rod 307a, crankshaft 306a, intake valve 303a and outlet valve 308a are operated in the same sequences as that of cylinder 301, piston 302, extension rod 305, connection rod 307, crankshaft 306, intake valve 303 and outlet valve 308 with respect to their own actual positions and directions respectively.

Embodiment of the Invention with Opposed Piston Engine with Phase Shift in Time and Offset in Position Based on the opposed piston engine 300 as described hereinabove, by manipulating the inter-relationship of pistons 302 and 302a, different results can be achieved.

When there is a phase shift in time between the movement sequence of the pistons 302 and 302a, the pistons 302 and 302a reach their respective top dead center (TDC) positions at different moments in time. For example, the piston 302a lags the piston 302 by a phase shift in time, that is, the piston 302 reaches its TDC earlier in time than piston 302a does.

When the piston 302 and 302a further have an offset with respect to their respective physical middle position, shown in an opposed engine 501 in FIG. 5, the piston 302 and 302a push their respective TDC positions into the range of swept volume of each other. That is, the moving trajectories of the piston 302 and 302a are partly overlapped. The respective TDC positions of the pistons 302 and 302a have crossed the middle position of the cylinders.

This arrangement can (1) keep the clearance volumes of the opposed piston engine less than 1/50 Vd or equal to zero, (2) obtain more possible combinations of combustion volumes versus crank angles, (3) make ignition time more flexible, (4) move the in-cylinder peak pressure (Pmax) to more available positions in order to achieve more preferable F2/F1 results, (5) make the piston 302 and 302a produce unequal tangential force on their crankshafts 306 and 306a in a same combustion stroke, respectively.

When the first piston 302 reaches its top dead center earlier than that of the second piston 302a, and the second piston 302a is near its respective top dead center, the exhaust valve 314 of the combustion chamber is shut off and the inlet valve 311 of the combustion chamber is opened. A certain amount of compressed air in the air storage tank 318 is led into the combustion chamber 310 through the output pipe 316 of the air storage tank and the inlet valve 311 of the combustion chamber. A certain amount of fuel is injected by a fuel pump 313 into the combustion chamber 310. Said fuel and the compressed air are mixed in the combustion chamber 310 to produce a combustible gas mixture. Then, spark plug 312 ignites the combustible gas mixture in the combustion chamber 310 to cause said mixture to combust and expand. When the amount of compressed air injection reaches the required amount, the inlet valve 311 of the combustion chamber is shut off.

When the first piston 302 passes its bottom dead center, the first crankshaft 306 drives the first piston 302 upward through the first extension rod 305 and the first connection rod 307.

When the second piston 302a moves near its bottom dead center, the exhaust valve 314 of the combustion chamber is opened, the second crankshaft 306a drives the second piston 302a downward through the first extension rod 305a and the second connection rod 307a, the burnt air and fuel (exhaust gas) in the combustion chamber 310 is discharged.

The cylinder 301a, piston 302a, extension rod 305a, connection rod 307a, crankshaft 306a, intake valve 303a and outlet valve 308a are operated in the same sequences but with a phase shift in time as that of cylinder 301, piston 302, extension rod 305, connection rod 307, crankshaft 306, intake valve 303 and outlet valve 308 with respect to their own actual positions and directions respectively.

For different fuels, the air storage tank 318 may choose different air pressures, as illustrative and non-exhaustive examples: gasoline 20 bar, diesel 30 bar, ethanol 23 bar, etc. The setting of these pressures also needs to take consideration of the compressed air injection time and injection volume, fuel injection time and injection volume and the timing of ignition. The invention engine can use different fuels, for example, gasoline, diesel, ethanol, methanol, vegetable oil, etc.

FIG. 5 shows the comparison of an embodiment of an opposed engine 500 without phase shift and position overlapped versus an embodiment of an opposed engine 501 with phase shift and position overlapped.

Here, the upper piston refers to the second piston 302a, and the lower piston refers to the first piston 302.

Table 4 below is a comparison chart of an embodiment of an opposed engine 500 without phase shift and position overlapped versus an embodiment of an opposed engine 501 with phase shift and position overlapped. Details are shown in curve 503 and curve 504 in FIG. 6. Here, the lower piston refers to the piston 302 and upper piston refers to the piston 302a.

TABLE 4

| Opposed Piston Engine 500 without Phase Shift and Position Overlapped | Opposed Piston Engine 501 with Phase Shift and Position Overlapped |
|---|---|
| Movements of the lower piston and upper piston have no phase difference in time. phase shift = 0. | Movements of the lower piston and upper piston have a phase difference in time. phase shift > 0. |
| Lower piston and upper piston reach their respective TDC position at the same time. | Lower piston and upper piston reach their respective TDC position at different times. |
| The lower piston and upper piston is not overlapped in position. Offset = 0. | The lower piston and upper piston is overlapped in position. Offset > 0. |
| The lower piston and upper piston do not cross the cylinder centerline (middle position). | Both the lower piston and upper piston cross the cylinder centerline (middle position). |

In FIG. 6, curve 503 shows the positions of the two pistons, the combustion chamber volume vs. the crankshaft angle in engine 500 without phase shift and position overlap. Curve 504 shows the positions of the two pistons, the combustion chamber volume vs. the crankshaft angle of engine 501 with phase shift and position overlap.

As the shown in curve 504 of piston positions in FIG. 6 and curve 204 of tangential force in FIG. 3B, because there is a phase shift in time, the tangential forces produced by a same combustion on the first crankshaft and the second crankshaft are different at any given moment before the position of Tmax of the first piston.

Table 5 below is a comparison table of various parameters of four different piston engines. The crank angle CA is with respect to the horizontal axis in FIG. 6.

TABLE 5

| Example A | Example B | Example C | Example D |
|---|---|---|---|
| Existing Conventional Opposed Piston Engine | Embodiment of an Opposed Piston Engine according to the present invention | Embodiment of an Opposed Piston Engine according to the present invention | Embodiment of an Opposed Piston Engine according to the present invention |
| Vc = 10% Vd | Vc = 0 | Vc = 0 | Vc = 0 |
| Phase shift | Phase shift | Phase shift = 45° CA, | Phase shift = 60° CA, |
| Offset = 0 | Offset = 0 | Offset = 4.7% Vd | Offset = 8.3% Vd |

As shown in Table 6 below, under the same working conditions, for the above four examples, the tangential forces on crankshaft F2/F1 are different.

TABLE 6

| Opposed Piston Engine L/R = 4/1 | Example A Vc = 10% | Example B Vc = 0 | Example C Vc = 0 | Example D Vc = 0 |
|---|---|---|---|---|
| Engine strokes | 2 | 2 | 2 | 2 |
| Upper Piston displacement | Vd = 100% | Vd = 100% | Vd = 100% | Vd = 100% |
| Lower Piston displacement | Vd = 100% | Vd = 100% | Vd = 100% | Vd = 100% |
| Combustion volume Vpk | 10.9% × 2 | 10.9% × 2 | 10.9% × 2 | 10.9% × 2 |
| Compression ratio | 11:1 | N/A | N/A | N/A |
| Clearance Volume | 1/10 | 0 | 0 | 0 |
| Phase shift in CA | 0 | 0 | 45 | 60 |
| Overlapped swept volume (offset of piston) | N/A | 0 | 4.7% | 8.3% |
| Upper piston F2/F1 at Vpk | 21.6% | 68.8% | 31% | 19.7% |
| Lower piston F2/F1 at Vpk | 21.6% | 68.8% | 97% | 102% |
| Air pressure w/o ignition | 20 bar | 20 bar | 20 bar | 20 bar |
| Peak in-cylinder pressure | 50 bar | 50 bar | 50 bar | 50 bar |
| Start of ignition position | −20° CA | 4.7° CA | 29.5° CA | 39.1° CA |
| In-cylinder peak pressure Pmax position | 10° CA | 34.7° CA | 59.5° CA | 69.1° CA |
| Fuel consumption | 1 unit | 1 unit | 1 unit | 1 unit |
| Sum of F2/F1 of two Pistons at Vpk | 43.2% | 137.6% | 128% | 121.7% |

Regarding Example A, the existing conventional opposed piston engine, the sum of F2/F1=43.2% and the torque is 43.2% for two pistons.

Regarding Example B, which corresponds to the piston engine 500 in FIG. 5 and curve 503 in FIG. 6, wherein Vc=0, the two opposed pistons run synchronously and symmetrically, offset=0. There is no phase difference. The torque is increased by 219%.

Regarding Example C, which refers to piston engine 501 in FIG. 5 and curve 504 in FIG. 6, wherein Vc=0, piston 302a lags piston 302 at an angle 45° CA, phase shift is 45° CA and the positions of the two pistons are offset towards the middle position by 4.7%, the offset is 4.7%. The torque is increased by 196%.

Regarding Example D, which refers to piston engine 501 in FIG. 5 and curve 504 in FIG. 6, Vc=0, but piston 302a lags the piston 302 at an angle 60° CA, phase shift is 60° CA, the positions of the two pistons are offset to the middle position by 8.3%, and the offset is 8.3%, and the calculation result. The torque is increased by 181%.

Table 6 shows that under the same working conditions, the F2/F1 value of the existing conventional opposed piston engine (Example A) is the smallest. The F2/F1 values of embodiments of the present invention (Examples B, C, and D) are much higher than that of the existing conventional opposed piston engine (Example A).

In other words, when using the same amount of fuel, embodiments of the present invention (Examples B, C, and D) can output more tangential forces on crankshafts than that of the existing conventional opposed piston engine (Example A).

Although the present invention has been described in considerable detail with reference to certain preferred embodiments thereof, other embodiments and modifications are possible. Therefore, the scope of the appended claims should not be limited by the preferred embodiments set forth in the examples, but should be given the broadest interpretation consistent with the description as a whole.

The invention claimed is:

1. A single piston engine system, comprising:
   a cylinder defining an interior space therein,
   the cylinder encloses a combustion chamber, a piston configured to fit horizontally and sealingly in the cylinder and move vertically therewithin, and a compression chamber, wherein the upper face of the piston defines the bottom end of the combustion chamber and the lower face of the piston defines the top end of the compression chamber,
   the combustion chamber comprises an inlet valve connected to an output pipe of an air storage tank,
   the compression chamber comprises an outlet valve connected to an input pipe of the air storage tank and an intake valve connected to fresh air,
   a controller connected to a fuel tank, wherein according to the type of fuel in the fuel tank, the controller determines the required air pressure of the compression chamber via the intake valve,
   an extension rod connected to the lower face of the piston and extends through an aperture at the bottom of the cylinder, the extension rod is connected to a crankshaft via a connection rod,
   wherein fuel is pumped into the combustion chamber from the fuel tank and air is compressed as pressured air and injected into the compression chamber by its own pressure from the air storage tank,
   wherein combustion expansion and air compression are completed in a same downward stroke of the piston,
   wherein combustion expansion and air compression are completed in different chambers,
   wherein gas contained in the combustion chamber is discharged in an upward stroke of the piston, and
   wherein clearance volume of the combustion chamber is obtainable at less than 1/50 of the combustion chamber displacement volume, clearance volume of the compression chamber is obtainable at less than 1/50 of the compression chamber displacement volume, or both.

2. The single piston engine system according to claim 1, wherein the clearance volume of the combustion chamber is zero, the clearance volume of the compression chamber is zero, or both.

3. The single piston engine system according to claim 1, wherein kinetic energy from the crankshaft is recovered and stored in the compressed air by compression stroke of the piston driven by rotation of the crankshaft.

4. The single piston engine system according to claim 1, wherein the ignition of the fuel and the compressed air in the combustion chamber occurs after the top dead centre, the in-cylinder peak pressure of the combustion chamber occurs after 30° of the crank angle.

5. The single piston engine system according to claim 1,
   wherein the air storage tank comprises an oil-gas separation element to separate lubricating oil collected in the air storage tank from the compressed air in the air storage tank to prevent the lubricating oil from entering into the combustion chamber, and
   wherein the air storage tank comprises a pressure sensor connected to the controller, wherein when the air pressure in the air storage tank reaches a certain level, the controller controls the intake valve of the compression chamber to stop compressing the fresh air.

6. The single piston engine system according to claim 1, wherein when the piston moves upward and near its top dead center position, an exhaust valve of the combustion chamber is shut off, and the inlet valve of the combustion chamber is opened, the compressed air in the air storage tank is led into the combustion chamber through the output pipe of the air storage tank and the inlet valve of the combustion chamber, and fuel is injected by a fuel pump into the combustion chamber, the fuel and the compressed air are mixed in the combustion chamber to produce a combustible gas mixture, and
   wherein a spark plug in the combustion chamber ignites the combustible gas mixture in the combustion chamber to cause said mixture to combust and push the piston downward, the piston pushes the extension rod of the piston downward, the extension rod in turn pushes the connection rod, the connection rod then drives the crankshaft.

7. An opposed piston engine system, comprising:
   a first cylinder and a second cylinder, each defining an interior space therein, wherein the second cylinder is an inverted version of the first cylinder and is installed in an opposed position of the first cylinder,
   the first cylinder encloses a first compression chamber, a first piston configured to fit horizontally and sealingly in the first cylinder and move vertically therewithin, the second cylinder encloses a second compression chamber, a second piston configured to fit horizontally and sealingly in the second cylinder and move vertically therewithin, the first piston and the second piston are installed in an opposed position, wherein the first cylinder and second cylinder share a combustion chamber, wherein the upper face of the first piston defines the bottom end of the combustion chamber and the lower face of the first piston defines the top end of the first compression chamber, wherein the lower face of the second piston defines the top end of the combustion chamber and the upper face of the second piston defines the bottom end of the second compression chamber, the combustion chamber comprises an inlet valve connected to an output pipe of an air storage tank, the first compression chamber comprises a first outlet valve to an input pipe of the air storage tank and a first intake valve connected to fresh air, the second compression chamber comprises a second outlet valve to the input pipe of the air storage tank and a second intake valve connected to fresh air, a controller connected to a fuel tank, wherein according to the type of fuel in the fuel tank, the controller determines the required air pressures of the first and second compression chambers via the first and the second intake valves, a first extension rod connected to the lower face of the first piston and extends through an aperture at the bottom of the first cylinder, the first extension rod is connected to a first crankshaft via a first connection rod, a second extension rod connected to the upper face of the second piston and extends through an aperture at the top of the second cylinder, the second extension rod is connected to a second crankshaft via a second connection rod, wherein fuel is pumped into the combustion chamber from the fuel tank and air is compressed as pressured air and injected into the first and second compression chambers by its own pressure from the air storage tank, wherein combustion expansion and air compression are completed in a same stroke of the first piston, combustion expansion and air compression are completed in a same stroke of the second piston, wherein gas contained in the combustion chamber is discharged when the first piston and the second piston move from their bottom dead centers to their top dead centers, and wherein clearance volume of the combustion chamber is obtainable at less than 1/50 of the combustion chamber displacement volume, clearance volumes of the first and the second compression chambers are obtainable at less than 1/50 of the first and the second compression chambers displacement volumes respectively, or both.

8. The opposed piston engine system according to claim 7, wherein clearance volume of the combustion chamber is zero, the clearance volumes of the first and second compression chambers are zero, or both.

9. The opposed piston engine system according to claim 7, wherein the first and second extension rods are sealed by a first and second sealed sliding rings respectively, wherein the first and second extension rods are configured to move up and down freely and are air-tightened to prevent the compressed air in the first and second compression chambers from leaking out.

10. The opposed piston engine system according to claim 7, wherein the ignition of the fuel and the compressed air in the combustion chamber occurs after the top dead centre of the first piston and the second piston, the in-cylinder peak pressure of the combustion chamber occurs after 30° of the crank angle of the first piston and the second piston.

11. The opposed piston engine system according to claim 7, wherein the air storage tank comprises an oil-gas separation element to separate lubricating oil collected in the air storage tank from the compressed air in the air storage tank to prevent the lubricating oil from entering into the combustion chamber, and wherein the air storage tank comprises a pressure sensor connected to the controller, wherein when the air pressure in the air storage tank reaches a certain level, the controller controls the first and the second intake valves of the first and the second compression chambers to stop compressing the fresh air respectively.

12. The opposed piston engine system according to claim 7, wherein when the first and the second pistons are moving near their respective top dead center positions, an exhaust valve of the combustion chamber is shut off and the inlet valve of the combustion chamber is opened, the compressed air in the air storage tank is led into the combustion chamber through the output pipe of the air storage tank and the inlet valve of the combustion chamber, and fuel is injected by a fuel pump into the combustion chamber, the fuel and the compressed air are mixed in the combustion chamber to produce a combustible gas mixture, wherein a spark plug in the combustion chamber ignites the combustible gas mixture in the combustion chamber to cause said mixture to combust and (1) push the first piston downward, the first extension rod in turn pushes the first connection rod, the first connection rod then drives the first crankshaft, (2) push the second piston upward, the second extension rod in turn pushes the second connection rod, the second connection rod then drives the second crankshaft, and wherein the first crankshaft and the second crankshaft operate at the same rotating speed and in the same rotating direction.

13. An opposed piston engine system with phase shift in time and offset in position, comprising:

a first cylinder and a second cylinder, each defining an interior space therein, wherein the second cylinder is an inverted version of the first cylinder and is installed in an opposed position of the first cylinder, the first cylinder encloses a first compression chamber, a first piston configured to fit horizontally and sealingly in the first cylinder and move vertically therewithin, the second cylinder encloses a second compression chamber, a second piston configured to fit horizontally and sealingly in the second cylinder and move vertically therewithin, the first piston and the second piston are installed in an opposed position, wherein the first cylinder and second cylinder share a combustion chamber, wherein the upper face of the first piston defines the bottom end of the combustion chamber and the lower face of the first piston defines the top end of the first compression chamber, wherein the lower face of the second piston defines the top end of the combustion chamber and the upper face of the second piston defines the bottom end of the second compression chamber, the combustion chamber comprises an inlet valve connected to an output pipe of an air storage tank, the first compression chamber comprises a first outlet valve to an input pipe of the air storage tank and a first intake valve connected to fresh air, the second compression chamber comprises a second outlet valve to the input pipe of the air storage tank and a second intake valve connected to fresh air, a controller connected to an fuel tank, wherein according to the type of fuel in the fuel tank, the controller determines the required air pressures of the first and second compression chambers via the first and the second intake valves, a first extension rod connected to the lower face of the first piston and extends through an aperture at the bottom of the first cylinder, the first extension rod is connected to a first crankshaft via a first connecting rod, a second extension rod connected to the upper face of the second piston and extends through an aperture at the top of the second cylinder, the second extension rod is connected to a second crankshaft via a second connection rod, wherein fuel is pumped into the combustion chamber from the fuel tank and air is compressed as pressured air and injected into the first and second compression chambers by its own pressure from the air storage tank, wherein combustion expansion and air compression are completed in a same stroke of the first piston, combustion expansion and air compression are completed in a same stroke of the second piston, wherein gas contained in the combustion chamber is discharged when the first piston and the second piston move from their bottom dead centers to their top dead centers, wherein clearance volume of the combustion chamber is obtainable at less than $\frac{1}{50}$ of the combustion chamber displacement volume, clearance volumes of the first and the second compression chambers are obtainable at less than $\frac{1}{50}$ of the first and second compression chambers displacement volumes respectively, or both, wherein there is a phase shift in time between movement sequence of the first piston and the second piston, the first piston and the second piston reach their respective top dead center positions at different moments of time, wherein the first piston and the second piston have an offset with respect to their respective physical middle position, and push the respective top dead centre positions of the first piston and the second piston into the range of swept volume of each other, wherein combustion occurs in the combustion chamber and air compressions occur in the first and the second compression chambers, wherein tangential forces produced by a same combustion on the first crankshaft and the second crankshaft are different at any given moment before the position of Tmax of the first piston, and wherein at moment of ignition, positions of the first piston and the second piston are different in their respective crank angles.

14. The opposed piston engine system according to claim 13, wherein clearance volume of the combustion chamber is zero, the clearance volumes of the first and the second compression chambers are zero, or both.

15. The opposed piston engine system according to claim 13, wherein the first and the second extension rods are sealed by a first and second sealed sliding rings respectively, wherein the first and the second extension rods are configured to move up and down freely and is air-tightened to prevent the compressed air in the first and second compression chambers from leaking out.

16. The opposed piston engine system according to claim 13, wherein the inside walls of the first and second cylinders and/or the first and second pistons are lubricated with lubricating oil.

17. The opposed piston engine system according to claim 13, wherein the air storage tank comprises an oil-gas separation element to separate lubricating oil collected in the air storage tank from the compressed air in the air storage tank to prevent the lubricating oil from entering into the combustion chamber.

18. The opposed piston engine system according to claim 13, wherein the first piston and the second piston reach their respective top dead center positions at different moments of time respectively, when the second piston reaches near its top dead center, an exhaust valve of the combustion chamber is shut off and the inlet valve of the combustion chamber is opened, the compressed air in the air storage tank is led into the combustion chamber through the output pipe of the air storage tank and the inlet valve of the combustion chamber, and fuel is injected by a fuel pump into the combustion chamber, the fuel and the compressed air are mixed in the combustion chamber to produce a combustible gas mixture, and wherein a spark plug in the combustion chamber ignites the combustible gas mixture in the combustion chamber to cause said mixture to combust and (1) push the first piston downward, the first extension rod in turn pushes the first connection rod, the first connection rod then drives the first crankshaft, the first piston compresses the air in the first compression chamber when the first intake valve is shut off, (2) the second piston upward, the second extension rod in turn pushes the second connection rod, the second connection rod then drives the second crankshaft, the second piston compresses air in the second compression chamber when the second intake valve is shut off.

19. The opposed piston engine system according to claim 13, wherein when the first piston and second piston are in motoring actions, (1) the first crankshaft pushes the first piston downward through the first connection rod and the first extension rod, the first piston compresses air in the first compression chamber when the first intake valve is shut off, kinetic energy from the first crankshaft is recovered and stored in the compressed air, (2) the second crankshaft pushes the second piston upward through the second connection rod and the second extension rod, the second piston compresses the air in the second compression chamber when the second intake valve is shut off, kinetic energy from the second crankshaft is recovered and stored in the compressed air.

20. The opposed piston engine system according to claim 13, wherein the first piston reaches its bottom dead center earlier than the second piston does in a combustion stroke, when the second piston moves near its bottom dead center, the exhaust valve of the combustion chamber is opened, the second crankshaft drives the second piston downward through the first extension rod and second connection rod, the gas contained in the combustion chamber is discharged.

* * * * *